United States Patent
Ham

[15] 3,643,907
[45] Feb. 22, 1972

[54] LOAD-CARRYING VEHICLES

[72] Inventor: Rowland Herbert Ham, 10, Park Lane, Twyford, Berkshire, England

[22] Filed: Nov. 13, 1969

[21] Appl. No.: 876,248

[30] Foreign Application Priority Data

Nov. 19, 1968 Great Britain......................54,921/68

[52] U.S. Cl.........................248/439, 248/188.6, 248/354 P, 280/150.5
[51] Int. Cl.........................................................B60s 9/00
[58] Field of Search...................248/439, 351, 354 R, 354 P, 248/188.6; 280/150.5; 254/86

[56] References Cited

UNITED STATES PATENTS

| 2,372,705 | 4/1945 | Bicker | 254/86 |
| 3,104,891 | 9/1963 | Dalton | 280/150.5 |
| 3,450,415 | 6/1969 | Martin | 280/150.5 |

*Primary Examiner*—J. Franklin Foss
*Attorney*—Imirie & Smiley

[57] ABSTRACT

A demountable vehicle body with supporting legs, pivoted to the vehicle body frame with a stay pivoted to the lower portion of each leg and at its upper end having a pin moving along an inclined element fixed to the frame and engaging in a recess in the track in the erected position of the leg.

3 Claims, 5 Drawing Figures

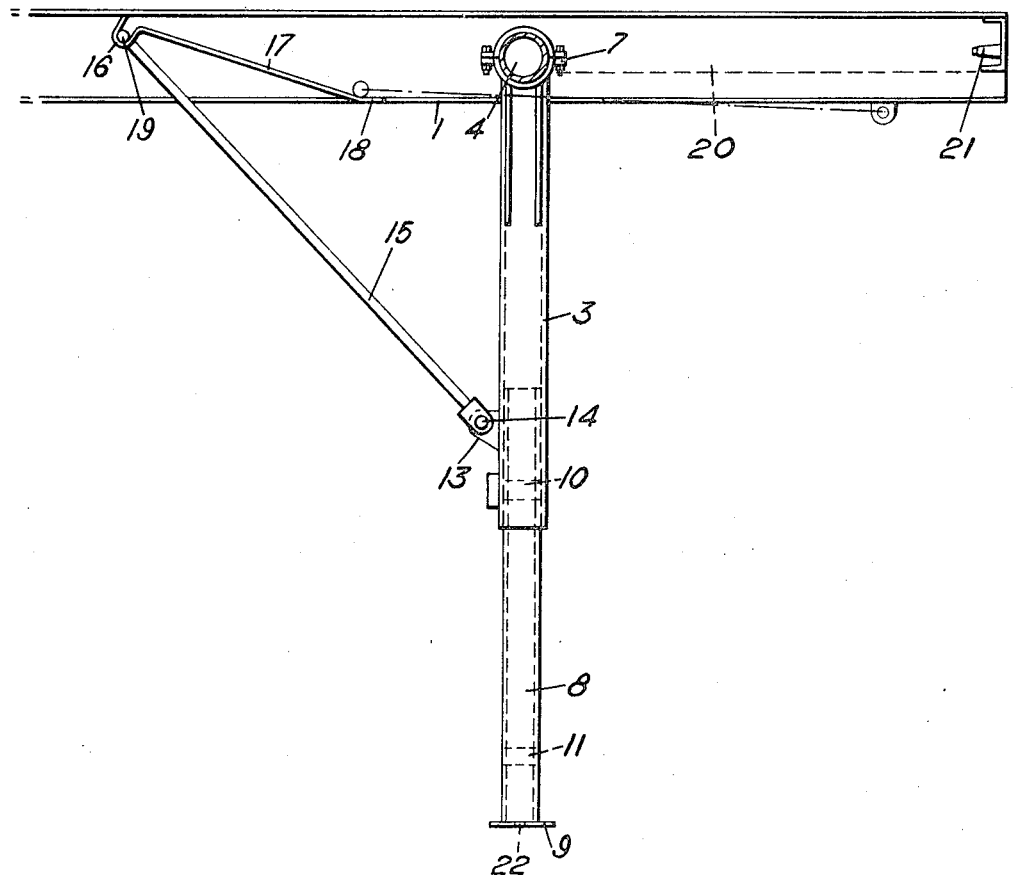
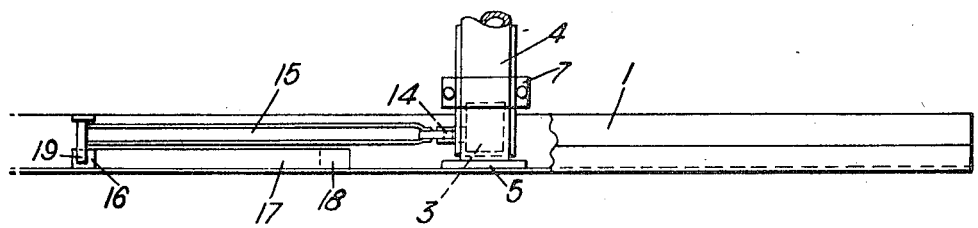

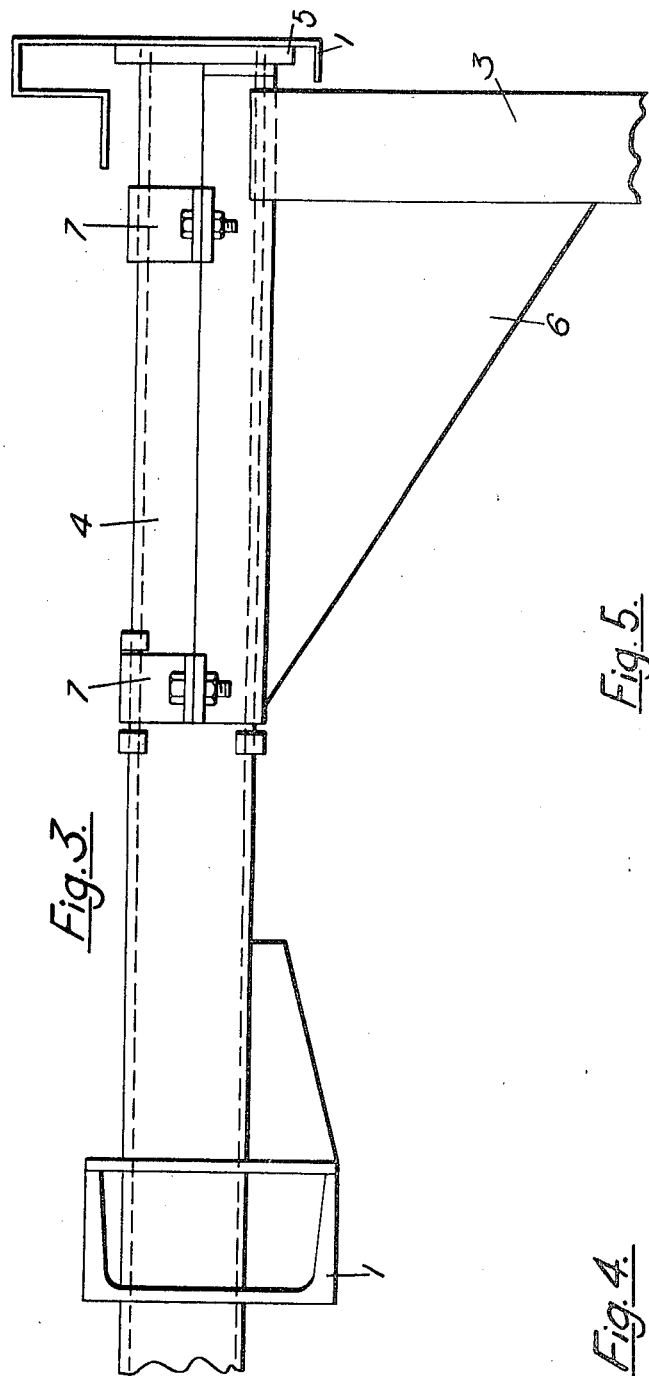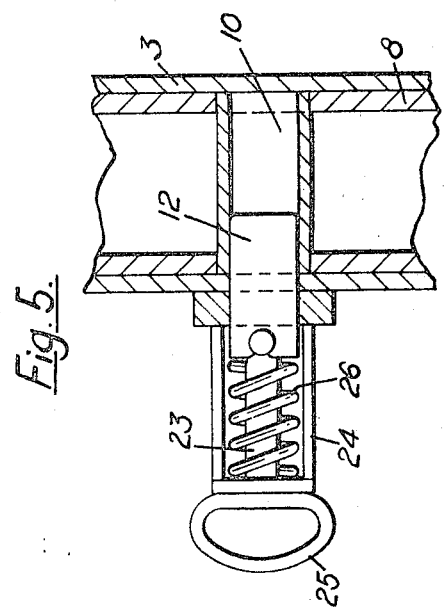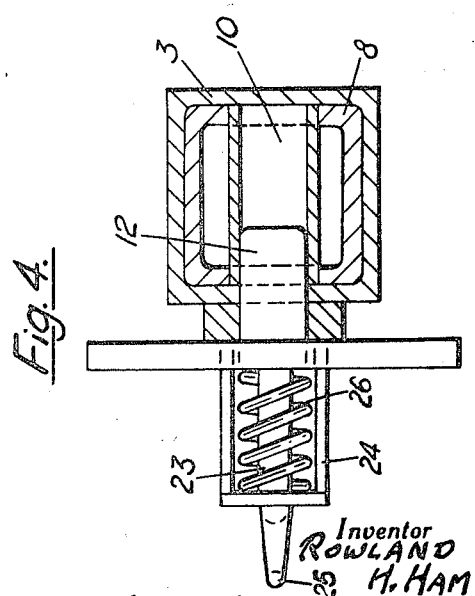

3,643,907

LOAD-CARRYING VEHICLES

BACKGROUND OF THE INVENTION

Field of the Invention

This invention relates to improvements in demountable load carrying bodies, that is to say load-carrying bodies have retractable legs upon which the bodies may stand above the ground at a height which enables a load-carrying vehicle to be backed with its load-carrying chassis beneath the load, which can then be lowered onto the vehicle chassis while its legs are retracted or moved into an inoperative position.

SUMMARY

According to the present invention a demountable load-carrying body comprises a load bearing frame of chassis having front and rear legs at each side, the front and/or rear legs each being pivotally supported by the frame at their upper ends, a leg stay for each front and/or rear leg pivoted at its lower end portion to the leg at a point removed from the frame or chassis pivot and at its upper end having a transverse pin engageable in the erected position in a recess fixed with respect to the frame to secure the leg, the pin, when the leg is pivoted into the collapsed position, moving along a guide, fixed with respect to the frame or chassis, which supports the pin in the collapsed position, and means for holding the leg in the collapsed position.

The guide preferably comprises an elongated platelike element fixed to the frame with the recess at one end portion and with an inclined pin track downwardly inclined from the recess towards the leg, the length of the track being greater than the full movement of the pin so as to continue to support the pin when the leg is fully collapsed.

The pair of collapsible legs preferably move independently but may be fast on a shaft extending transversely of the frame or chassis whereby both legs of the pair move in unison from one position to the other. The legs are preferably provided with their lower portions moveable longitudinally with respect to their upper portions so that they can be retracted in the collapsible position.

BRIEF DESCRIPTION OF THE DRAWINGS

FIG. 1 is a side view of the rear of a load-carrying body chassis or frame and one of its collapsible rear legs, FIG. 2 is a partial plan view of FIG. 1, FIG. 3 is an end view of FIG. 1 looking from the left, FIG. 4 is a cross section through a leg-locking device, and FIG. 5 is a cross section through a leg-locking device.

DESCRIPTION OF THE PREFERRED EMBODIMENT

The load-carrying body has a frame or chassis indicated by longitudinal chassis members 1 which may be of channel cross section as seen at the left-hand side of FIG. 3. This frame or chassis has rear legs 3 and retractable front legs; although a rear leg is shown this construction may be used for the front and/or rear legs. When the legs are in the erected position shown in FIGS. 1 to 3, they support the frame or chassis above the ground by a height which enables a load-carrying vehicle to be driven backwards with its load-bearing portion under the body; the body can then be supported on jacks which permit the legs to be collapsed and then lower the body onto the vehicle for transit. Unloading is performed in the same way, the movements being in the reverse order.

The rear legs 3 in the drawings are pivoted at their upper ends on a shaft 4 which extends through and spaces the distance between the two laterally spaced members 1. Preferably as shown at 5 the two legs are welded (or they may be otherwise secured) to the shaft so that they pivot in unison one with the other. The legs may be braced to the shaft by a welded gusset 6 as shown. The shaft is supported in bearings 7 fixed with respect to the members 1.

The leg is tubular and open at its lower end so that an extension 8 can move telescopically therein and the extension has a ground engaging plate 9 at its lower end. The extension and leg have apertures 10, 11 therethrough into which a locking pin 12 (FIG. 4) can be engaged to support the extension in the extended or retracted position.

Towards the lower end of the leg is a bracket 13 having an eye therein to receive a pin 14 which passes through an eye in the lower end of a stay 15. On the member 1 is a stay guide and this comprises an elongated plate fast with the member 1 as by welding and extending laterally therefrom. At the rear end the plate is curved to form a recess 16 and forwardly therefrom it extends downwardly inclined at 17, its front end 18 being horizontal. The stay has at its upper end a laterally extending pin 19 which engages in the recess when the leg is in the erected position to secure it.

On moving the leg to the collapsed position, shown by dotted lines 20 in FIG. 1, the pin is moved out of the recess and then moves along the inclined guide track 17, until the leg is fully collapsed when it is supported by the front end 18 of the guide. This front end of the guide may have a recess, e.g. similar to the recess 16 and a catch is provided to prevent it jumping out of this recess when the loaded vehicle is travelling. A catch may also be provided to retain the pin 19 in the recess 16.

When the body is supported by the vehicle jacks, the locking pin 12 is withdrawn from the apertures 10 and the extension 8 is telescoped into the leg until the pin 12 can be engaged in the aperture 11. The extension may be driven further into the leg for the purpose to be explained. It will be understood that providing relative longitudinal movement between the extension and leg is possible, the leg and extension may have interengaging cross sections other than tubular.

On the member 1 adjacent to but spaced a short distance from the plate 9 when the extension is fully retracted, is a tapered lug 21 and the plate 9 has an aperture 22 therein. Thus when the extension 8 is fully retracted the leg is swung up to the collapsed position and then the extension is moved towards the lug 21 which enters the aperture 22. The position of the aperture 11 is such that in this position the locking pin 12 can engage in it thus locking the collapsed leg.

The pin 12 (FIG. 4) comprises a pin having a shank 23 extending through a housing 24, its outer end having a handle 25 outside the casing. The pin is urged into the apertures 10, 11 by a spring 26 in the housing and the pin is retracted by the vehicle driver pulling on a handle 25 to compress the spring.

Thus by the leg arrangement of the invention the vehicle driver can stand beside the leg and operate it easily to collapse or erect the leg.

I claim:

1. A demountable load carrying vehicle body comprising a frame, a pair of front legs and a pair of rear legs one of each pair being at each side of said frame, the legs of at least one of said pairs being pivotally supported on their upper ends by said frame to support the vehicle in a vertical position and raised to a horizontal position along the frame in an inoperative position, a leg stay for each said pivoted leg, each said stay being pivoted at tee lower end portion of said leg at a point spaced from said upper end pivot, a transverse pin at the upper end of said stay, a recess fixed with respect to said frame engageable by said pin when said leg is erected, a guide fixed with respect to said frame and along which said pin moves from the erected to the collapsed position and which supports said pin in the collapsed position, and a device holding said leg in the collapsed position, said guide comprising an elongated plate element fixed to said frame, a recess at one end portion of said element, a downwardly inclined pin track forming part of said element and extending from said recess towards said leg, the length of said track being greater than the full movement of said pin and supporting said pin when said leg is collapsed.

2. A demountable load-carrying vehicle body according to claim 1, wherein the legs of each said pair are fast on a shaft extending transversely of said frame.

3. A demountable load-carrying vehicle body according to claim 1, wherein said legs each have their lower portions moveable with respect to their upper portions for retraction in the collapsed position.

* * * * *